P. W. WOODS.
FASTENER FOR WAGON SEATS.
APPLICATION FILED NOV. 12, 1908.
950,361.
Patented Feb. 22, 1910.
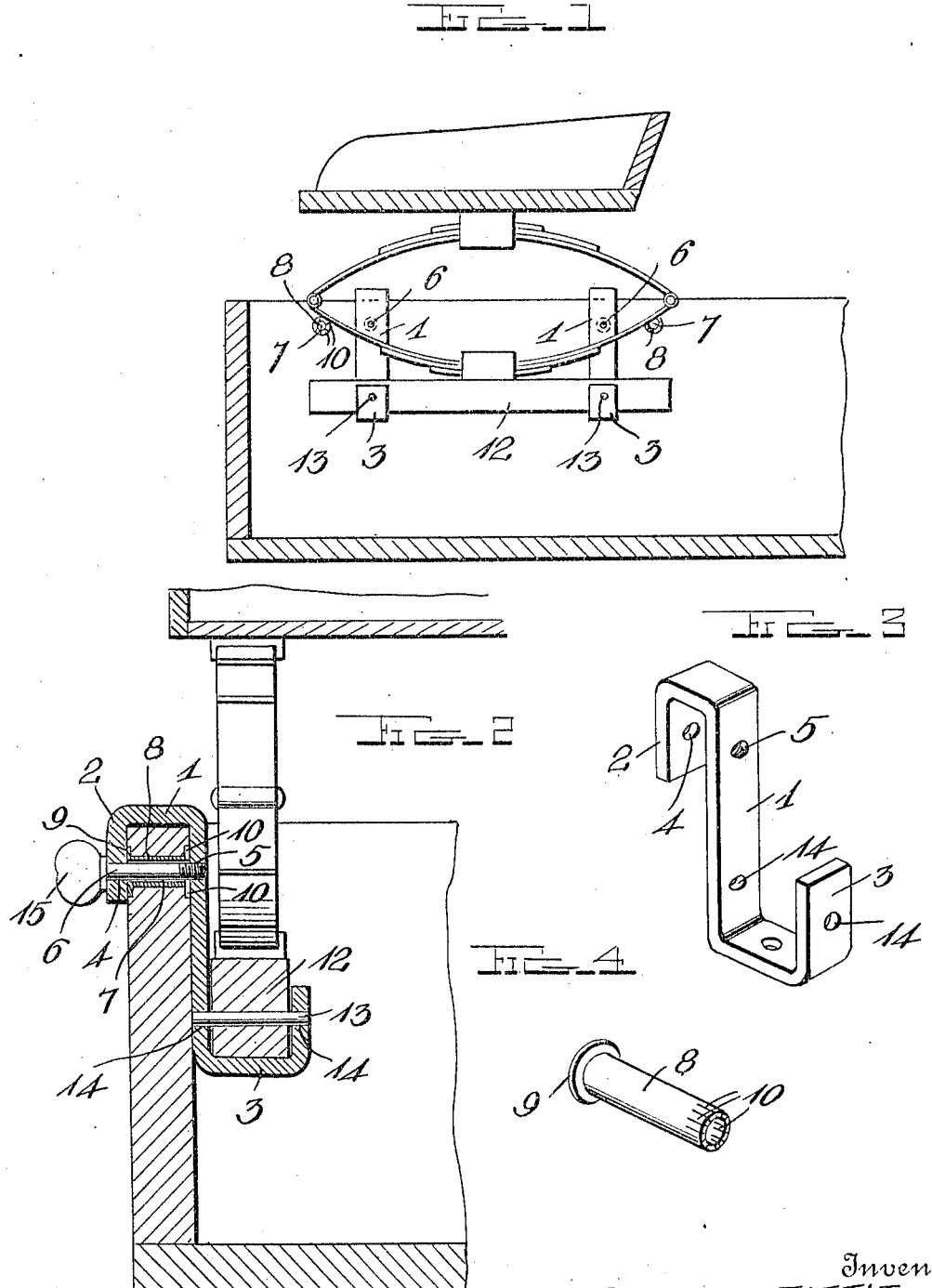
Witnesses
C. H. Griesbauer
Inventor
Patrick W. Woods
By H. B. Willson & Co.
Attorneys

UNITED STATES PATENT OFFICE.

PATRICK W. WOODS, OF HELENA, MONTANA.

FASTENER FOR WAGON-SEATS.

950,361.  Specification of Letters Patent.  Patented Feb. 22, 1910.

Application filed November 12, 1908. Serial No. 462,284.

*To all whom it may concern:*

Be it known that I, PATRICK W. WOODS, a citizen of the United States, residing at Helena, in the county of Lewis and Clark and State of Montana, have invented certain new and useful Improvements in Fasteners for Wagon-Seats; and I do declare the following to be a full, clear, and exact description of the invention, such as will enable others skilled in the art to which it appertains to make and use the same.

This invention relates to fasteners for wagon seats.

The object of the invention is to provide a fastener of this character by means of which seats may be quickly and easily fastened in place on the sides of a wagon body and locked against movement or casual displacement.

With this and other objects in view, the invention consists of certain novel features of construction, combination and arrangement of parts as will be described and particularly pointed out in the appended claim.

In the accompanying drawings, Figure 1 is a vertical longitudinal sectional view through a wagon and seat showing the application of the invention thereto; Fig. 2 is a vertical cross sectional view through one end of the seat, one side of the wagon and the fastening device; Fig. 3 is a detail perspective view of one of the fastening hooks; and Fig. 4 is a similar view of the wear sleeve or eye to receive the fastening bolt.

Referring more particularly to the drawings, 1 denotes the fastener which consists of a flat metal bar bent to form an upper body-engaging hook, 2, and a lower seat supporting hook, 3. The hooks 2 and 3 are preferably of rectangular shape, and the upper hook, 2, is adapted to be engaged with the upper edge of the side of the wagon, as shown. In the end of the hook, 2, is formed a transversely disposed bolt hole, 4, which alines with a similar hole, 5, formed in the upper portion of the bar. The hole, 5, is threaded and is adapted to be engaged by the threaded end of a locking pin or bolt, 6, which is inserted through the hole, 4, in the end of the hook, 2, and through one of a series of apertures, 7, formed in the side of the wagon body.

The apertures, 7, in the sides of the wagon are preferably provided with a wear sleeve, 8, whereby the edges of the apertures are protected against being worn by the bolt or pin, 6. The sleeve, 8, is formed of suitable metal, and has on one end an annular flange, 9, to engage the side of the wagon, while the other end is slitted inwardly or notched to form a series of tongues, 10, which, after the sleeve has been inserted through the apertures, 7, are bent down and clenched into engagement with the adjacent wall of the side of the wagon, thereby securely fastening the sleeve in place.

The lower hook, 3, is adapted to receive the spring supporting bar, 12, said bar being fastened in the hook by a pin or bolt, 13, which is passed through alined apertures, 14, formed in the end of the hook, 3, and the opposite portion of the bar, as shown. The bolt, 6, which secures the upper hook of the fastener to the side of the wagon, is preferably provided with a flat head, 15, whereby it may be readily gripped and screwed into and out of engagement with the hook and side of the wagon.

While I have shown and described the fastener as being engaged with the spring supporting bar of a seat, it is obvious that the fastener may be connected directly to the seat in any suitable manner and that one or more of the fasteners may be employed on each side of the wagon, as desired.

By means of a fastener constructed as herein shown and described, a seat may be quickly and easily fastened in place on the wagon body and securely locked against sliding movement in any direction and prevented from being displaced or bounced off the wagon when the latter is being moved over rough or uneven surfaces.

By providing the plurality of apertures, 7, through the sides of the wagon body, the fastening devices may be adjustably connected thereto to support the seat in different positions.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what

I claim as new and desire to secure by Letters-Patent, is:

In combination with a wagon body having transverse apertures in its side pieces, a series of fastening devices comprising metal strips having their upper ends bent to form L-shaped hook members adapted to engage the upper edges of the side pieces of the body, the outer portions of the hook members having transverse smooth or unthreaded apertures and the upper ends of the bodies of the fastening devices having transverse threaded apertures, said threaded and unthreaded apertures registering with each other and with the ends of the openings in the side pieces of the wagon body, tubular bushings or bearings arranged in the openings of said side pieces, and fastening bolts passing through the apertures in the hook members and the tubular bushings and screwing in the threaded apertures in the bodies of the fastening devices.

In testimony whereof I have hereunto set my hand in presence of two subscribing witnesses.

PATRICK W. WOODS.

Witnesses:
 THOS. B. WOOD,
 ANNIE M. STEWART.